Figures 1A, 1B:
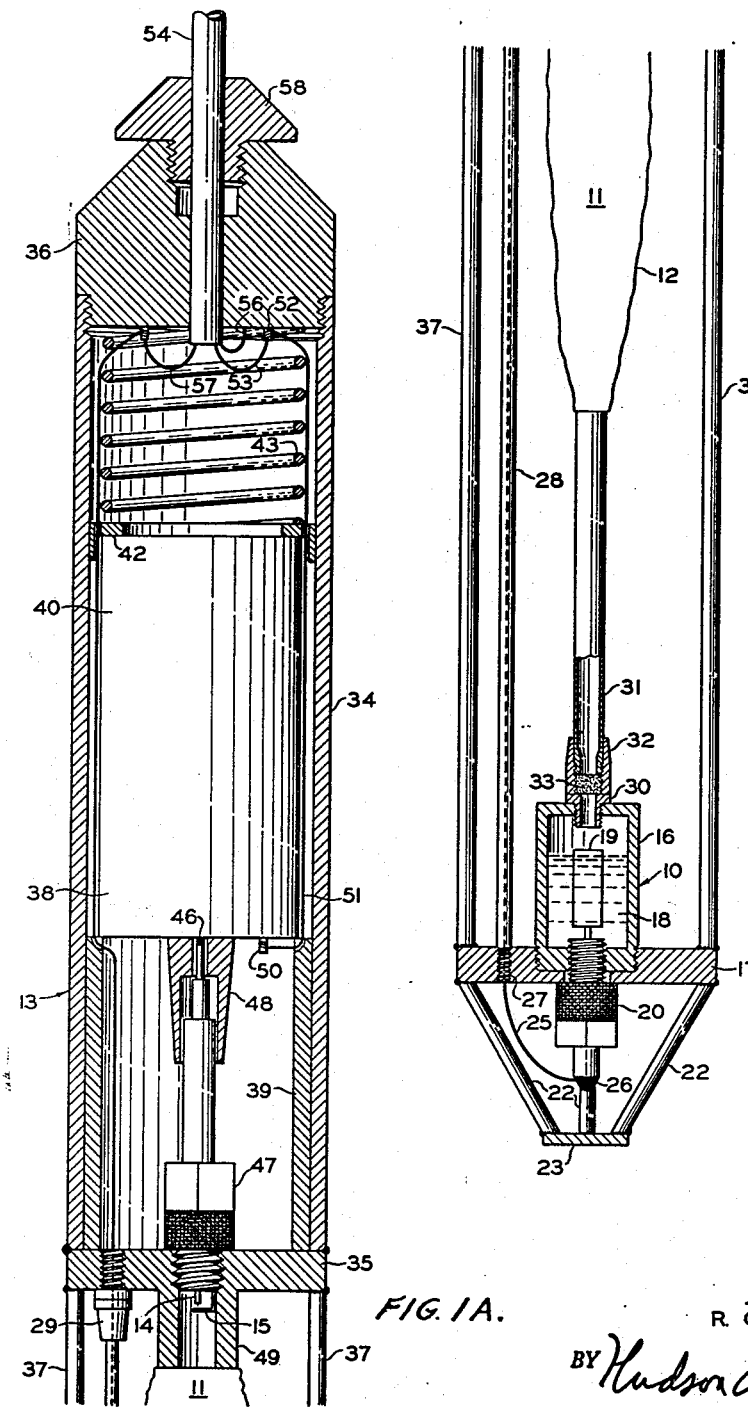

May 25, 1954 R. G. PIETY 2,679,205
METHOD OF AND APPARATUS FOR PRODUCING SEISMIC WAVES
Filed Feb. 18, 1949 3 Sheets-Sheet 1

INVENTOR.
R. G. PIETY
BY Hudson & Young
ATTORNEYS

May 25, 1954    R. G. PIETY    2,679,205
METHOD OF AND APPARATUS FOR PRODUCING SEISMIC WAVES
Filed Feb. 18, 1949    3 Sheets-Sheet 3

INVENTOR.
R. G. PIETY
BY Hudson & Young
ATTORNEYS

Patented May 25, 1954

2,679,205

UNITED STATES PATENT OFFICE 2,679,205

METHOD OF AND APPARATUS FOR PRODUCING SEISMIC WAVES

Raymond G. Piety, Bartlesville, Okla., assignor to Phillips Petroleum Company, a corporation of Delaware Application February 18, 1949, Serial No. 77,248

9 Claims. (Cl. 102—20)

This invention relates to a method of and apparatus for producing seismic waves.

In seismic prospecting, a seismic disturbance is set up at a predetermined location, referred to as the shot point, and this disturbance produces seismic waves which travel through the ground, a portion of these waves being reflected from subterranean strata to geophone stations where the reflected waves are converted into electrical voltages representative thereof. In this manner, valuable information regarding the nature and location of subterranean strata is obtained.

Heretofore, in practically all cases, the seismic disturbance has been created by detonating a charge of explosive, such as dynamite, at the shot point. It is generally unsatisfactory to produce such an explosion at the surface of the earth and, accordingly, a hole is drilled through the top soil or burden at the shot point to the first hard or rock-like formation beneath the burden, the charge being lowered to and detonated at the level of such formation.

This method of producing seismic waves has a number of disadvantages which add to the difficulty of seismic prospecting. For example, in many instances, it is desirable to produce two or more explosions at the same level in the drill hole. However, the first dynamite explosion oftentimes produces a large caved area in the drill hole at the point where the charge is detonated. This makes it very difficult to locate a second charge at the same level in the drill hole and the seismic waves produced by the second or subsequent explosions may not be identical to those produced by the first explosion due to change in configuration of the drill hole resulting from caving. In the second place, the drill hole is ordinarily filled with water or similar fluid at the time the explosion occurs, this water flowing into the well from water-bearing formations or being purposely introduced for tamping purposes. When the charge is exploded, this liquid is forcibly discharged from the drill hole and then falls to the earth in the region adjacent the drill hole. This produces a number of random seismic waves of small amplitude which may be picked up by the geophones during the recording period and interfere with the trace produced by the main seismic waves resulting from the explosion of the charge. Finally, the eruption of water from the drill hole resulting from the explosion makes it very difficult or impossible to locate a geophone at or adjacent the drill hole itself, which is desirable in many types of seismic work.

Artificial seismic waves are also produced in making velocity surveys of bore holes or wells. Heretofore, it has been necessary to produce the seismic wave by an explosion at the surface of the bore hole, the resulting seismic waves being measured by a down-hole geophone. Although it is desirable that the seismic wave be produced in the lower regions of the bore hole and the resulting waves measured at the surface, this cannot be done by the use of present techniques due to the danger of damage or destruction of the well or bore hole by detonation of an explosive charge therein.

It is an object of this invention to provide a method of and apparatus for producing the seismic waves which is free from the disadvantages of previous techniques.

It is a further object to provide a method and apparatus whereby an explosion is produced which is immediately followed by an implosion due to condensation of the explosion products, whereby damage to the sides of the hole in which the explosion takes place is effectively prevented and only an insignificant amount of water is discharged from the hole by the explosion.

It is a still further object of the invention to provide a generator for seismic waves which may be utilized without danger of damaging a well or bore hole when used in making down-hole velocity surveys.

Various other objects, advantages and features of the invention will become apparent from the following detailed description, taken in conjunction with the accompanying drawings, in which:

Figures 1A and 1B collectively are a vertical sectional view of my apparatus for producing seismic waves, the upper part of the apparatus being illustrated at the left of the sheet, and the lower part of the apparatus being shown at the right of the sheet.

Figure 2:
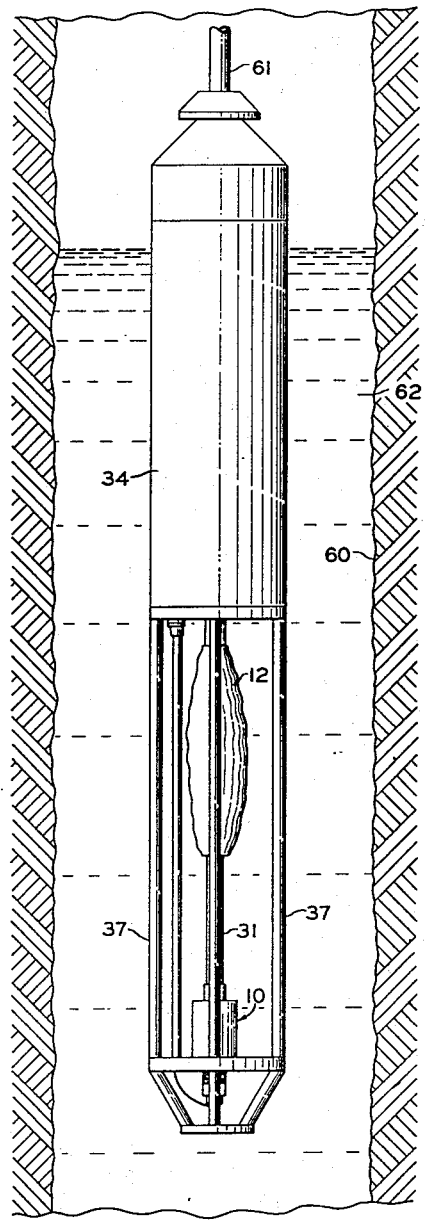
Figure 3A:
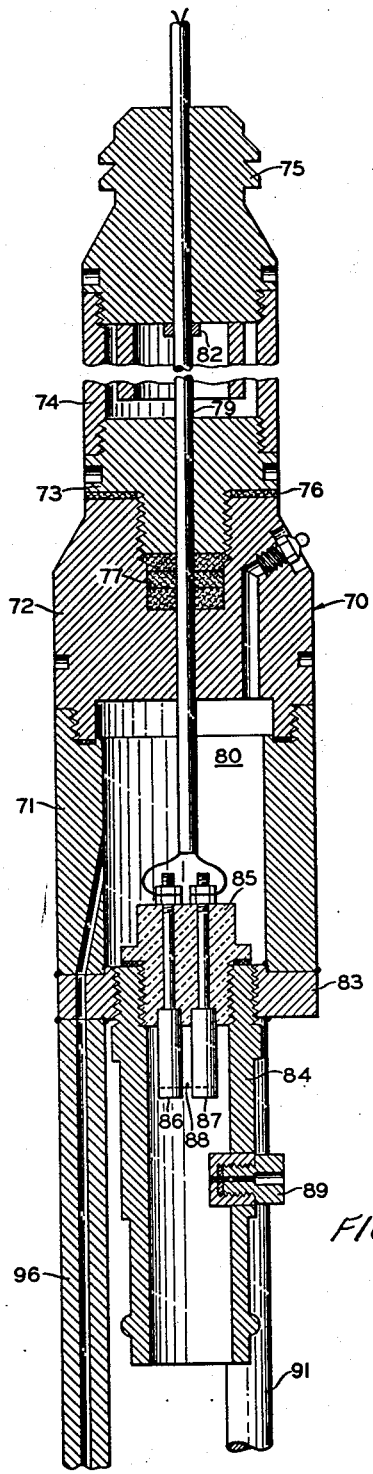
Figure 3B:
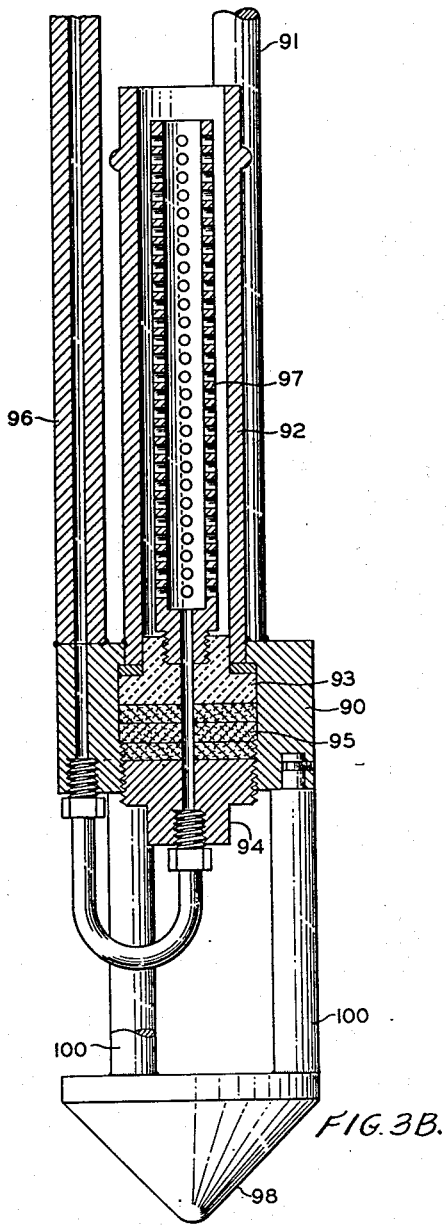

Figure 2 is a schematic view illustrating the apparatus suspended in a bore or drill hole; and Figures 3A and 3B are collectively a vertical sectional view, similar to Figures 1A and 1B, of a modified form of the apparatus.

Referring now to the drawings in detail, the apparatus comprises a gas generator 10 for producing an explosive gas mixture which is fed to a closed chamber 11 defined by an expansible membrane 12, the mixture being detonated in this chamber by an ignition device 13 including a pair of spaced sparking electrodes 14, 15 which are disposed within the chamber 11.

The gas generator 10 includes a cell 16 which is screw threaded to a support or plate 17 and which is filled with an electrolyte 18. An electrode 19 is immersed in the electrolyte 18 and this electrode is supported by a plug 20 which is firmly secured to the support 17 which is fitted into a suitable recess in the support. The unit 20 may advantageously consist of a spark plug of conventional structure, the central terminal of the spark plug being secured, as by brasing, to the electrode 19 and the plug being impregnated with a suitable sealing compound to form a liquid seal between the cell 16 and the exterior of the apparatus. The lower end of spark plug 20 is protected against mechanical damage by a set of rods 22 which are secured to the lower end of support 17 and which converge inwardly to a plate or support 23. A lead 25 is connected through sealing material 26 at the lower end of the spark plug and one end of this lead extends through the spark plug barrel to the spark plug terminal connected to electrode 19. The other end of lead 25 extends through a passage 27 in support 17 and a plastic tube 28 to a sealed connector unit 29.

Preferably, the electrolyte 18 is sulfuric acid, the electrode 19, which forms the anode of the cell, is formed from Monel metal, and the body 16, which forms the cathode of the cell, is formed from stainless steel. It is not intended to limit the invention to the preferred materials, as other substances familiar to those skilled in the art may be used. When a current is passed between the anode and cathode, it will be apparent that an explosive mixture of hydrogen and oxygen gas is produced by electrolysis, and this mixture passes through a plug 30, which is screw threaded into the top of cell 16, to a tube 31. A sleeve 32 is secured to the plug 30, as by brasing, and this sleeve is interiorly threaded to carry the tube 31. A body of material 33, such as steel wool, is mounted in the sleeve 32 to prevent passage of liquid from the cell 16 to the tube 31 while permitting free passage of gases from the cell into the tube.

The ignition device 13 is housed in a closed region defined by a cyclindrical casing 34, a lower support or plate 35 parallel to and longitudinally spaced from plate 17, and an upper support 36 which are secured together to form a unitary assembly. The support 35 is rigidly secured to support 17 by a series of spaced rods 37. A spark coil 38 is mounted within the casing 34 with its lower end resting on spacer disc 39 concentric with and mounted within the casing 34. The upper end of spark coil 38 is engaged by a flanged spacer ring 42 which is urged downwardly by a spring 43 mounted between the ring 42 and the upper support 36. In some cases, the spark coil battery may be mounted inside the casing 34 in the position indicated by reference character 40.

One high potential terminal of the spark coil is grounded to the casing and thereby connected to the electrode 15. The other high potential terminal 46 is connected to electrode 14 through a plug 47 which may advantageously be a conventional spark plug. This plug is screw threaded into a suitable opening in support 35 and it is impregnated with a suitable sealing compound so as to prevent liquids or gases passing between the chamber 11 and the spark coil chamber. In order to obtain mechanical rigidity, the upper end of the spark plug may be received within a suitable bushing 48 protruding downwardly from the spark coil 38. It will be noted that the electrodes 14, 15 are disposed within a tube 49 depending from and secured to the support 35. One terminal of the low potential spark coil winding is grounded and the other low potential terminal 50 is connected by a lead 51, which extends through suitable openings in spacer rings 39, 42, to a terminal 52 and a lead 53, which extends through a tube 54 to a suitable cable leading to the surface control system. The sleeve 54 also carries a lead 56, which is grounded to the casing, and a lead 57 which extends through suitable openings in spacer rings 39, 42 to sealed connector unit 29 and lead 25. It will be apparent that the spark coil 38 is energized when a suitable potential is impressed between leads 53, 56 from a surface potential source and that the sulfuric acid electrolyte in cell 16 is electrolyzed when a suitable current is passed through leads 56 and 57. The tube 54 is received within and secured to a threaded cap 58 which is received in complementary threads within the support 36, and the tube 54 is filled with a suitable sealing compound to prevent leakage of liquids or gases into the spark coil chamber.

The expansible membrane 12 is suitably secured to the lower end of tube 49 and to the upper end of tube 31 to form the chamber 11, this chamber including the electrodes 14, 15 and communicating with the interior of the cell 16 through tube 31.

The operation of the apparatus will now be apparent to those skilled in the art. The unit is lowered into a drill hole or well 60, Figure 2, by a cable 61 to a depth at which it is desired to produce seismic waves and current is passed between the anode 19 and cathode 16 through the electrolyte 18, thereby producing an explosive gas mixture by electrolysis which passes upwardly through the filler material 33 and tube 31 into the expansible membrane 12. It will be understood that the drill hole is at least partially filled with an incompressible liquid 62. When a sufficient quantity of explosive mixture has accumulated in the chamber 11, spark coil 38 is actuated to produce a spark between electrodes 14 and 15, thereby detonating the explosive mixture within the chamber 11 and producing seismic waves at the desired location in the well or bore hole. Immediately after the detonation, the explosion products condense and thereby produce a sudden contraction or implosion within the chamber 11 to contract it to its original volume, or less than its original volume. The process may be repeated as soon as desired by again passing current through the cell electrodes to produce a fresh charge of explosive mixture.

It will be apparent that the method and apparatus of this invention provide a number of important advantages. By the use of this apparatus a shock for producing seismic waves may be generated at any point in a well or bore hole without damaging the sides thereof, and the geophone units may be placed at any point on the surface or, if desired, in the hole. The use of a plurality of geophones at the surface makes possible the determination of the horizontal component of velocity. Alternatively, a number of the described generators may be suspended in a drill hole and activated simultaneously. This permits determinations not only of the average velocity from the source to the geophone but also of interval velocities between the explosion points beneath the surface of the earth, and this operation may be repeated as many times as desired without damage to the hole or loss of time. In seismic work, by generating a shock at various points in the drill hole, it is possible to determine the best point at which to locate a dynamite charge to set up a seismic disturbance for prospecting.

In another embodiment of this invention, a plurality of the described units are placed in a series of shallow holes. In this manner, any or all of the units may be actuated at the same time to produce the effect of a dynamite blast in a drill hole. This permits substitution of shallow auger holes for expensive shot holes, and also eliminates a large portion of the ground roll. Although the total energy of the multiple explosion is small compared to the usual dynamite blast, the energy is more effective because none of it is expended in shattering and pulverizing adjacent rock. Ordinarily an explosion near the surface scatters debris over the surface which interferes with the detection of the seismic waves resulting from the explosion. This invention obviates this objection since the products of the explosion condense, and thereby generate a desirable implosive effect immediately after the explosion.

From the above description, it is apparent that repeated seismic disturbances may be produced at a single point in a drill or bore hole without hole damage with resultant elimination of the need for inserting a new charge for each seismic disturbance desired. Thus, the present apparatus is ready for use again as soon as enough hydrogen and oxygen is generated by again supplying current to cell 16, the time of which is less than removing wire leads and placing a new charge down the hole. Due to the implosion feature, water is not thrown out of the hole, and the resulting spurious waves are not present in the geophone recorder trace. Also, a number of generators may be suspended one above the other in the same hole. For shallow work, the necessity for an extra truck to haul dynamite is eliminated.

In Figures 3A and 3B, I have shown a modification of the invention which is preferred for commercial use. This apparatus includes a casing 70 formed from a plurality of tubular sections 71, 72, 73, 74, and a cap 75. Washers 76, 77 are disposed between the units 72 and 73 and a tube 79 extends through the whole assembly to a chamber 80, this tube being sealed at 82 by a suitable resilient gasket. A support 83 is suitably secured to the lower end of unit 71, this support being adapted to receive a depending tubular member 84 and a plug 85 which is formed from insulating material. A pair of spaced electrodes 86, 87 are mounted in plug 85 and these electrodes are connected by a filament 88. Suitable conductors extend through the tube 79 for supplying heating current to the electrodes and filament. The tube 84 is provided with a valve assembly 89 to permit gas to be admitted to or removed from within an expansible membrane which is secured to tube 84 in the manner described in connection with Figure 1. A lower plate or support 90 is held in spaced relation to the support 83 by rods 91 and this support has a tube 92 secured thereto by a plug 93.

A plug 94 is screw threaded in a suitable opening in support 90 and a series of insulated washers 95 are mounted between plug 93 and plug 94. A tube 96, which is similar to the tube 28 of Figure 1, provides an electrical connection between the conductors carried by tube 79 and a perforated tube 97 which is screw threaded in the block 93, this tube being of smaller diameter than and concentric with the outer tube 92. An expansible membrane, not shown, is adapted to be supported on the tubes 84, 92 in a manner similar to that described in connection with Figure 1. The lower end of the apparatus is provided with a guard 98 which is secured to and spaced from the support 90 by rods 100.

In the modified form of the invention, the tube 92 functions as the cathode, and the tube 97 functions as the anode, the cell being filled with a suitable electrolyte. The materials for the anode, cathode and electrolyte may be simular to those of Figure 1. Accordingly, when current is passed between the anode and cathode by the conductor extending through tube 96, an explosive gas mixture is generated which fills the expansible membrane connected to the tubes 84 and 92. When it is desired to detonate this mixture, current is passed through filament 88 of sufficient amperage as to heat it is incandescence, thereby igniting the explosive gas mixture. It is a feature of the construction of Figure 3 that, if desired, a geophone may be mounted within chamber 80 to provide a signal at the instant at which detonation occurs. Also, the use of a hot filament rather than a sparking device as the ignition means enables the amount of apparatus within the bore hole to be substantially reduced without detracting from the advantages of the invention, as set forth in connection with Figure 1. Finally, the construction of the cell is definitely leak-proof and well liquids are positively excluded from the interior of the cell.

While the invention has been described in connection with a present, preferred embodiment thereof, it is to be understood that this description is illustrative only and is not intended to limit the invention, the scope of which is defined by the appended claims.

Having described my invention, I claim:

1. Apparatus for producing seismic waves comprising, in combination, a tubular casing adapted to be lowered into a drill hole, a spark coil mounted in said casing, a pair of vertically spaced supports cooperating with said casing to form a closed region for receiving said spark coil, an ignition device including a pair of spaced electrodes mounted on the lower of said supports, said electrodes being connected to said spark coil, a tube depending from said lower support and housing said electrodes, a plate disposed below said lower support, a gas generator carried by said plate including an electrolytic cell for producing an explosive gas mixture, a tube protruding upwardly from said cell and communicating therewith, an expansible membrane secured to said tubes and forming a closed chamber therewith, means for actuating said generator to fill said chamber with an explosive gas mixture, and means for actuating said coil to produce a spark across said electrodes, thereby to ignite the explosive gas mixture in said chamber.

2. A generator for producing seismic waves comprising, in combination, a tubular casing adapted to be lowered into a drill hole, a spark coil mounted in said casing, a pair of vertically spaced supports cooperating with said casing to form a closed region for receiving said spark coil, an ignition device including a pair of spaced electrodes mounted on the lower support, said electrodes being connected to said spark coil, a tube depending from said lower support and housing said electrodes, a plate disposed below the lower support, a gas generator including a metal cell carried by said plate, an electrolyte in said cell, an electrode in said cell in contact with said electrolyte, means for passing an electric current between said electrode and said cell through said electrolyte to produce an explosive gas mixture, a tube protruding upwardly from said cell, an expansible membrane connected between said tubes and forming a gas-tight chamber therewith, whereby the gas produced by electrolysis in said cell flows into and fills said chamber, and means for actuating said spark coil to produce a spark between said electrodes, thereby to detonate the gas mixture in said chamber, the combustion products thereafter condensing to produce an implosion through an abrupt reduction of pressure in said chamber.

3. Apparatus in accordance with claim 2 in which the electrolyte is sulfuric acid, the cell is formed from stainless steel, and the cell electrode is formed from Monel metal whereby an explosive mixture of hydrogen and oxygen is produced by electrolysis in said cell, and the exploding gases condense to form water and thereby produce said implosion.

4. Apparatus for producing seismic waves comprising, in combination, a tubular casing adapted to be lowered into a bore hole, a support forming a part of said casing, a pair of spaced electrodes mounted on said support, a filament connected between said electrodes, a tube depending from said support and housing said electrodes, a plate disposed below said support, a gas generator carried by said plate including an electrolytic cell for producing an explosive gas mixture, a tube protruding upwardly from said cell and communicating therewith, an expansible membrane secured to said tubes and forming a closed chamber therewith, means for actuating said generator to fill said chamber with an explosive gas mixture, and means for heating said filament to ignite the explosive gas mixture in said chamber.

5. Apparatus for producing seismic waves comprising, in combination, a tubular casing adapted to be lowered into a bore hole, a support forming a part of said casing, a pair of spaced electrodes mounted on said support, a filament connected between said electrodes, a tube depending from said support and housing said electrodes, a plate disposed below said support, a gas generator carried by said plate including a tube extending upwardly from said plate, said tube constituting the cathode of an electrolytic cell, a smaller tube mounted within said cathode constituting the anode of said cell, an electrolyte in said cell, said anode being perforated to permit free passage of the electrolyte therethrough, an expansible membrane secured to said outer tube and said depending tube to form a closed chamber therewith, means for applying an electric potential between said anode and said cathode to fill said membrane with an explosive gas mixture, and means for heating said filament to ignite the explosive gas mixture.

6. In a method of seismic prospecting in which seismic waves are generated by explosive means, transmitted through the earth, received and recorded, the improvement comprising the steps of producing said waves by successively generating explosive amounts of oxygen and hydrogen gases by electrolysis of an electrolytic liquid in an underground zone, exploding said gases to regenerate said liquid and repeating said gas generating and exploding steps, said regenerated liquid being electrolyzed during the repeated gas generating steps, whereby repeated seismic explosions are achieved without destruction of the underground zone or spurious seismic tremors generated by falling material expelled from said zone.

7. Apparatus for producing seismic waves comprising, in combination, an elongated casing adapted to be lowered into a drill hole, a pair of longitudinally spaced plates secured to said casing, an ignition device secured to one of said plates, a support protruding from said one plate and housing said ignition device, a gas generator carried by said other plate and adapted to produce an explosive gas mixture, conduit means communicating with said gas generator and extending away from said last-mentioned plate, an expansible membrane secured to said support and said conduit means so as to form a closed chamber therewith, means for actuating said generator to fill said chamber with an explosive gas mixture, and means for actuating said ignition device to ignite the explosive gas mixture thus produced.

8. Apparatus for producing seismic waves comprising, in combination, an elongated casing adapted to be lowered into a drill hole, a pair of longitudinally spaced plates secured to said casing, an ignition device secured to one of said plates, a support protruding from said one plate and housing said ignition device, a gas generator carried by said other plate and adapted to produce an explosive gas mixture, said gas generator including a metal cell secured to said other plate, an electrolyte in said cell, an electrode in said cell in contact with said electrolyte, means for passing an electric current between said electrode and said cell through said electrolyte to produce an explosive gas mixture, conduit means communicating with said cell and extending away from said last-mentioned plate, an expansible membrane secured to said support and said conduit means so as to form a closed chamber therewith, means for actuating said generator to fill said chamber with an explosive gas mixture, and means for actuating said ignition device to ignite the explosive gas mixture thus produced.

9. Apparatus in accordance with claim 8 in which the electrolyte is sulfuric acid and in which the explosive gas is a mixture of hydrogen and oxygen.

References Cited in the file of this patent

UNITED STATES PATENTS

| Number | Name | Date |
| --- | --- | --- |
| 386,281 | Waddell | July 17, 1888 |
| 1,049,735 | Kowastch | Jan. 7, 1913 |
| 1,226,732 | White | May 22, 1917 |
| 1,627,991 | Owen | May 10, 1927 |
| 1,977,481 | Jones | Oct. 16, 1934 |

FOREIGN PATENTS

| Number | Country | Date |
| --- | --- | --- |
| 24,172 | Great Britain | 1893 |